United States Patent
Games et al.

(10) Patent No.: US 11,340,877 B2
(45) Date of Patent: May 24, 2022

(54) SYSTEM AND METHOD FOR HOLISTIC APPLICATION DEVELOPMENT AND DEPLOYMENT IN A DISTRIBUTED HETEROGENEOUS COMPUTING ENVIRONMENT

(71) Applicant: Network Native, Inc., Austin, TX (US)

(72) Inventors: Donald W Games, Austin, TX (US); Michael C Brogioli, Austin, TX (US); Richard Moats, Austin, TX (US)

(73) Assignee: NETWORK NATIVE, INC., Austin, TX (US)

( * ) Notice: Subject to any disclaimer, the term of this patent is extended or adjusted under 35 U.S.C. 154(b) by 0 days.

(21) Appl. No.: 16/721,913

(22) Filed: Dec. 19, 2019

(65) Prior Publication Data

US 2020/0301686 A1   Sep. 24, 2020

Related U.S. Application Data

(60) Provisional application No. 62/782,009, filed on Dec. 19, 2018.

(51) Int. Cl.
*G06F 9/44* (2018.01)
*G06F 9/445* (2018.01)
(Continued)

(52) U.S. Cl.
CPC ............... *G06F 8/60* (2013.01); *G06F 8/10* (2013.01); *G06F 9/44505* (2013.01);
(Continued)

(58) Field of Classification Search
CPC .......... G06F 8/60; G06F 8/10; G06F 9/44505; G06F 9/546; H04L 63/20; H04L 67/1053; H04L 67/34

See application file for complete search history.

(56) References Cited

U.S. PATENT DOCUMENTS

| | | | |
|---|---|---|---|
| 8,078,357 B1 * | 12/2011 | Trytten | G06F 8/20 701/36 |
| 2006/0161909 A1 * | 7/2006 | Pandey | G06F 8/60 717/168 |

(Continued)

FOREIGN PATENT DOCUMENTS

WO   WO-2018125250 A1 *   7/2018   ......... G06F 9/30189

OTHER PUBLICATIONS

Sean Pennefather, Exploration and Design of a Synchronous Message Passing Framework for a CPU-NPU Heterogeneous Architecture, 2018, pp. 46-55. https://ieeexplore.ieee.org/stamp/stamp.jsp?tp=&arnumber=8425384 (Year: 2018).*

*Primary Examiner* — Mongbao Nguyen
(74) *Attorney, Agent, or Firm* — Shah IP Law, PLLC

(57) ABSTRACT

A system and method of holistic application development and deployment in a distributed, heterogeneous computing environment. The method includes identifying an individual component from among a plurality of components in a target system as an identified component of a plurality of identified components, mapping each one of the identified components to respective ones of a target hardware node, generating intermediate code for each respective one of the target hardware nodes, generating serialization code for each respective communication interface between the target hardware nodes, transmitting the respective intermediate codes to each one of the target hardware nodes, and transmitting respective serialization codes to each communication interface of the target hardware nodes.

12 Claims, 14 Drawing Sheets

(51) Int. Cl.
  *G06F 9/455* (2018.01)
  *G06F 8/60* (2018.01)
  *G06F 8/10* (2018.01)
  *H04L 29/06* (2006.01)
  *H04L 67/00* (2022.01)
  *H04L 67/1042* (2022.01)
  *G06F 9/54* (2006.01)

(52) U.S. Cl.
  CPC ............. *G06F 9/546* (2013.01); *H04L 63/20* (2013.01); *H04L 67/1053* (2013.01); *H04L 67/34* (2013.01)

(56) References Cited

U.S. PATENT DOCUMENTS

| | | | | |
|---|---|---|---|---|
| 2008/0313282 A1* | 12/2008 | Warila | ................. | H04W 84/12 709/206 |
| 2014/0289717 A1* | 9/2014 | Chan | ....................... | H04L 67/22 717/147 |
| 2015/0169302 A1* | 6/2015 | DeAnna | ................. | G06F 9/541 717/140 |
| 2016/0034276 A1* | 2/2016 | Webb | .................... | G06F 21/125 726/2 |
| 2016/0062736 A1* | 3/2016 | Stanfill | .................... | G06F 8/34 717/105 |
| 2017/0262319 A1* | 9/2017 | Newburn | ............... | G06F 9/5038 |
| 2018/0225230 A1* | 8/2018 | Litichever | ............... | G06F 21/82 |
| 2018/0246708 A1* | 8/2018 | Benton | ..................... | G06F 8/47 |
| 2019/0089799 A1* | 3/2019 | Sathe | ...................... | H04L 67/12 |
| 2019/0347125 A1* | 11/2019 | Sankaran | ............... | G06F 9/4881 |
| 2020/0019423 A1* | 1/2020 | Marks | ................. | G06F 9/45525 |
| 2020/0034539 A1* | 1/2020 | Nogin | ....................... | G06F 8/30 |
| 2020/0089540 A1* | 3/2020 | Schardt | .................. | G06F 9/5027 |
| 2020/0310394 A1* | 10/2020 | Wouhaybi | ........... | H04L 41/0846 |
| 2020/0326915 A1* | 10/2020 | Retting | .................... | G06F 8/24 |

* cited by examiner

SYSTEM AND METHOD FOR HOLISTIC APPLICATION DEVELOPMENT AND DEPLOYMENT IN A DISTRIBUTED HETEROGENEOUS COMPUTING ENVIRONMENT

CROSS-REFERENCE TO RELATED APPLICATIONS

This application claims priority to U.S. Provisional Patent Application Ser. No. 62/782,009, filed Dec. 19, 2018 entitled "SYSTEM AND METHOD FOR HOLISTIC APPLICATION DEVELOPMENT AND DEPLOYMENT IN A DISTRIBUTED HETEROGENEOUS COMPUTING ENVIRONMENT." The entire content of that application is incorporated herein by reference.

BACKGROUND

Discussion of the State of the Art

Current software development techniques and frameworks are inadequate for introducing, updating, or deploying applications and/or devices in an enterprise-wide network of computing devices comprising of low-level embedded devices, fog layer of medium-powered hubs, and computationally sophisticated cloud-based servers. The difficulty in developing, designing, or deploying applications in these types of networks stems from the fact that the various devices in these networks tend to be diverse and often have very different computing resources available to them. Moreover, because of the very nature of these networks, it is often difficult to introduce updates at one or more nodes in the network without substantially altering or affecting other network components. Finally, the physical nature of low-level embedded device or edge internet-of-things (IoT) devices makes it difficult to fix, patch, and/or update these devices.

For example, embedded devices or edge IoT devices in such networks may be shipped with software that is written on bare metal, or with limited operating system and networking capabilities. Thus, once such devices roll off the assembly line, the only way to fix, patch, and/or update the device is through a technician visit or a recall. Moreover, development teams are often forced to work inefficiently to solve problems in heterogenous IoT networks because the various devices in these networks tend to be diverse, both in terms of their capabilities, and also in terms of their internal logic and communications protocols. For example, in distributed heterogeneous designs, large amounts of development effort are spent simply getting all the different components—and the teams developing the components—communicating with each other. The embedded part of the project team often spends most of its time simply getting the software to come up on the hardware within resource constraints and without crashing, while the cloud developers are adding and deploying new features on a weekly basis. This problem is exacerbated because in cloud-targeted application development, resources and frameworks have become and are continuing to become even more abstract. Bare metal machines have given way to virtual machines, which, in turn, have given way to containers. As a result, software components are built to communicate via lightweight APIs and message-buses that eliminate developer considerations of where or how many of a component is deployed. As a result, the inefficiencies introduced within development teams in terms of capital and human resources is made even worse.

Additionally, testing a newly developed application is an incredibly difficult process because it is often difficult to determine the devices and/or the code that is present at any given part of the network. As a result, these new developments are tested—often for the first time—in a fully deployed operational environment. This practice can potentially cause significant damage and down-time to the environment, and potentially introduce the system to security vulnerabilities. As a result, the process of deploying new embedded applications and/or devices often tends to be harrowing experience.

SUMMARY

The present invention overcomes many of the technical difficulties outlined above by offering a development environment, and runtime system that considers the heterogeneous targets of an IoT product as a single, coherent whole. More specifically, the present invention consumes an application specification that is associated with one or more devices or applications in a network environment, identifies independent components in the network by identifying message-passing boundaries and/or data-dependencies between code paths, maps the consumed application specification to identified independent components by leveraging one or more libraries (at least one of a generic library, an architecture-optimized library, or a part-specific library), encodes one more objects of the consumed application specification for a target's communication channel by detecting at least one of: message types that may traverse each channel from one target node to another, and the security needs for the communication channel, and transforms the consumed application specification into a format suitable for a target node.

Specifically, a method for the following is disclosed: identifying, by a processing system comprising a processor, an individual component from among a plurality of components in a target system as an identified component of a plurality of identified components; mapping, by the processing system, each one of the identified components to respective ones of a target hardware node; generating, by the processing system, intermediate code for each respective one of the target hardware nodes; generating, by the processing system, serialization code for each respective communication interface between the target hardware nodes; transmitting, by the processing system, the respective intermediate codes to each one of the target hardware nodes; and transmitting, by the processing system, respective serialization codes to each communication interface of the target hardware nodes.

A computer program product comprising a non-transitory computer readable storage medium having instructions encoded thereon that, when executed by a processor, cause the processor to: consume an application specification associated with a plurality of devices provided in a network environment as a consumed application specification; identify independent components in the network by identifying message-passing boundaries between code paths as identified independent components; map the consumed application specification to the identified independent components by leveraging one or more code libraries; encode one more objects of the consumed application specification for a target communication channel by detecting message types that may traverse each channel from one target node to another;

and transform the consumed application specification into a format suitable for a target node.

A system comprising: a processing system including a processor; and a memory, coupled to the processing system, that stores executable instructions and that, when executed by the processing system, facilitate performance of operations, comprising: identifying an individual component from among a plurality of components in a target system as an identified component of a plurality of identified components; mapping each one of the identified components to respective ones of a target hardware node; generating serialization code for each respective communication interface between the target hardware nodes; and transmitting, by the processing system, respective serialization codes to each communication interface of the target hardware nodes.

BRIEF DESCRIPTION OF THE DRAWING FIGURES

The accompanying drawings illustrate several embodiments and, together with the description, serve to explain the principles of the invention according to the embodiments. It will be appreciated by one skilled in the art that the particular arrangements illustrated in the drawings are merely exemplary and are not to be considered as limiting of the scope of the invention or the claims herein in any way.

DETAILED DESCRIPTION

Figure 1:
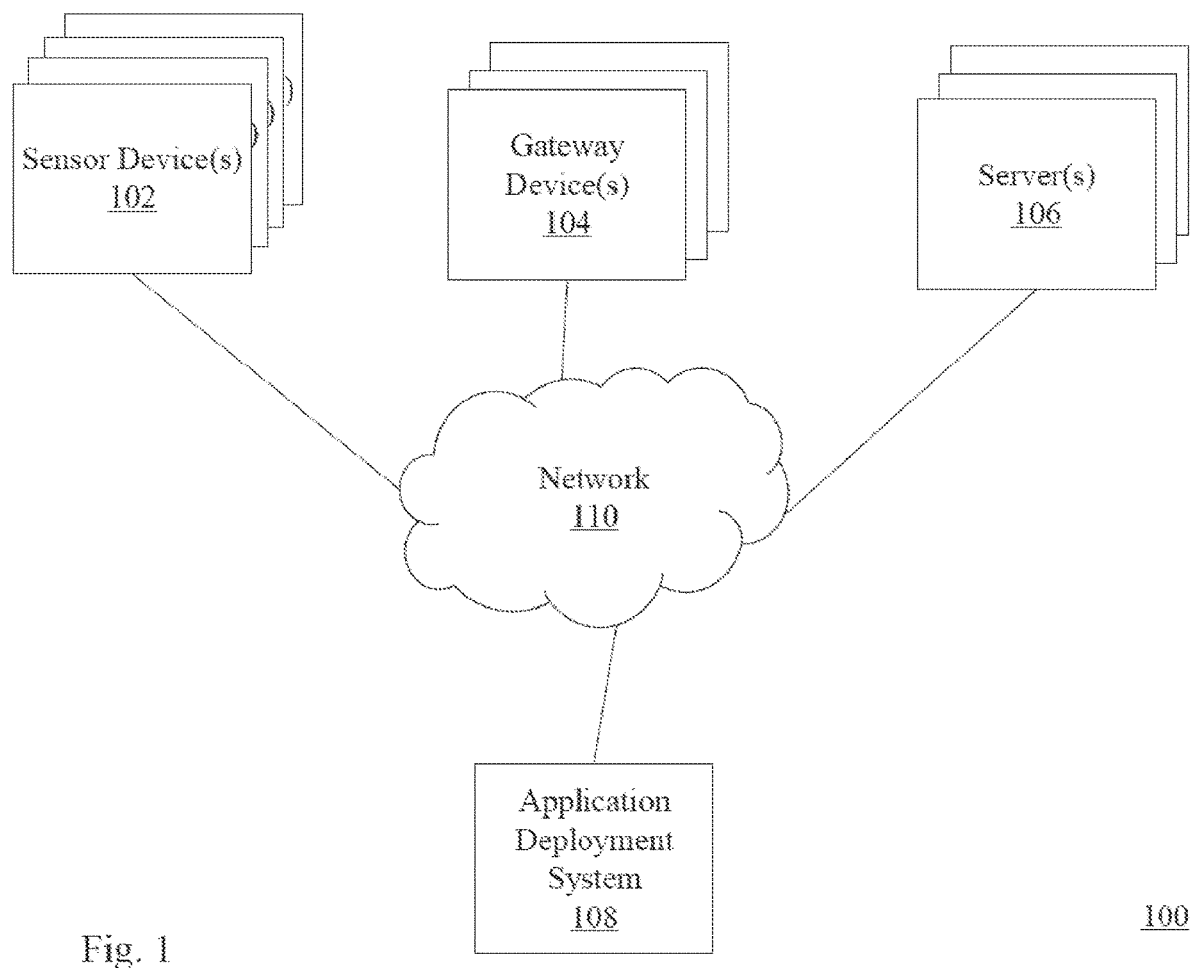
FIG. 1 is a block diagram illustrating an exemplary operating environment, according to a preferred embodiment of the invention.

The inventor has conceived, and reduced to practice, a system and method for writing and deploying applications to a distributed network comprising of heterogenous devices.

One or more different embodiments may be described in the present application. Further, for one or more of the embodiments described herein, numerous alternative arrangements may be described; it should be appreciated that these are presented for illustrative purposes only and are not limiting of the embodiments contained herein or the claims presented herein in any way. One or more of the arrangements may be widely applicable to numerous embodiments, as may be readily apparent from the disclosure. In general, arrangements are described in sufficient detail to enable those skilled in the art to practice one or more of the embodiments, and it should be appreciated that other arrangements may be utilized and that structural, logical, software, electrical and other changes may be made without departing from the scope of the embodiments. Particular features of one or more of the embodiments described herein may be described with reference to one or more particular embodiments or figures that form a part of the present disclosure, and in which are shown, by way of illustration, specific arrangements of one or more of the aspects. It should be appreciated, however, that such features are not limited to usage in the one or more particular embodiments or figures with reference to which they are described. The present disclosure is neither a literal description of all arrangements of one or more of the embodiments nor a listing of features of one or more of the embodiments that must be present in all arrangements.

One embodiment of the subject disclosure includes method that performs identifying an individual component from among a plurality of components in a target system as an identified component of a plurality of identified components, mapping each one of the identified components to respective ones of a target hardware node, generating intermediate code for each respective one of the target hardware nodes, generating serialization code for each respective communication interface between the target hardware nodes, transmitting the respective intermediate codes to each one of the target hardware nodes, and transmitting respective serialization codes to each communication interface of the target hardware nodes.

Another embodiment of the subject disclosure includes a device having a memory that stores executable instructions and a processor coupled to the memory. The processor, responsive to executing the executable instructions, performs operations including consuming an application specification associated with a plurality of devices provided in a network environment as a consumed application specification, identifying independent components in the network by identifying message-passing boundaries between code paths as identified independent components, mapping the consumed application specification to the identified independent components by leveraging one or more code libraries, encoding one more objects of the consumed application specification for a target communication channel by detecting message types that may traverse each channel from one target node to another, and transforming the consumed application specification into a format suitable for a target node.

Headings of sections provided in this patent application and the title of this patent application are for convenience only and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible embodiments and in order to more fully illustrate one or more embodiments. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the embodiments, and does not imply that the illustrated process is preferred. Also, steps are generally described once per aspect, but this does not mean they must occur once, or that they may only occur once each time a process, method, or algorithm is carried out or executed. Some steps may be omitted in some embodiments or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other embodiments need not include the device itself.

Techniques and mechanisms described or referenced herein will sometimes be described in singular form for clarity. However, it should be appreciated that particular embodiments may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various embodiments in which, for example, functions may be executed out of order from that shown or discussed, including substantially concurrently or in reverse order, depending on the functionality involved, as would be understood by those having ordinary skill in the art.

Conceptual Architecture

FIG. 1 illustrates an exemplary network comprising heterogeneous devices, which, in accordance with an embodiment of the invention, is comprised of one or more sensor device(s) 102, one or more gateway devices 104, servers 106, network 110, and an application deployment system 108. Although not illustrated in FIG. 1, the network may also be comprised of user devices or mobile computing devices that interface with the server or portions of the network. The network can exemplary be applied across an enterprise-wide network controlling any number of downstream devices. The specific elements described and illustrated herein may be varied in accordance with this description, as would be apparent to a person of ordinary skill in the art, without departing from the scope of the invention.

The sensor devices 102 that may be deployed in the network environment may vary based on the one or more uses cases described below. But generally, the sensor devices 102 capture certain information and provide to the gateway devices 104 either directly or via the network 110. In an IoT framework, the sensor devices 102 may be comprised of sensors (temperature sensors, imaging devices, machine vision, optical light sensors, position/proximity/presence sensors, motion/velocity/displacement sensors, humidity/moisture sensors, acoustic/sound/vibration detection sensors, chemical and gas sensors, flow rate detection sensors, force/load/torque/strain/pressure sensors, leak/level detectors, electric/magnetic sensors, acceleration/tilt sensors, etc.), actuators, recording devices, and more, as would be apparent to a person of ordinary skill in the art. In some instances, the software on the sensor devices 102 may exist in an abstraction layer. But in other instances, the code may be stored on metal. In some embodiments, the sensor devices 102 may be integrated into computing devices that interface with the device.

The gateway devices 104 that may be deployed in a heterogeneous network environment may vary based on one or more use cases described below. But generally, the gateway devices 104 interface with sensor devices 102 to compile, store, record, organize, the data that is output by the sensor devices 102. In an IoT framework, the gateway devices interface with the sensor devices 102 to record and/or store the values output by the sensor devices 102. In some embodiments, the gateway devices 104 may be comprised of their own IoT protocols, data management and messaging protocols, etc., as would be apparent to a person of ordinary skill in the art.

The servers 106 that may be deployed in a heterogenous network environment may vary based on one or more use cases described below. But generally, the server 106 interface with the gateway devices to enable certain applications, manage devices, manage data, etc., as would be apparent to a person of ordinary skill in the art. The various devices that may be used are described in greater detail below in reference to FIGS. 9-12.

The application deployment system 108 interfaces with the entire network to generate code that can be deployed at the sensor devices 102, gateway devices 104, and the servers 106. More specifically, the application deployment system 108 analyzes the network environment, splits it among one or more configured targets including a sensor level target, a gateway level target, and a server level target. In addition, the application deployment system 108 generates serialization code that is synthesized for each intra-node message-passing boundary. For example, in one embodiment of the invention, the application deployment system 108 generates intermediate code that is built by native compilers and transactionally deployed to physical nodes. As such, the application deployment system 108 enables deployment at build time, which is a significant breakthrough over the traditional systems for deploying devices or applications in a network of heterogenous devices. The specific components of the application deployment system 108 are described in greater detail below in reference to FIG. 2.

The sensor devices 102, the gateway devices 104, the servers 106, and the application deployment system 108 may be connected via a network 110. The network 110 may comprise a wide area network (WAN). The network 110 may comprise a local area network (LAN). The network 110 may comprise a physical connection between two or more of the scoring system 102, the feedback device 104, and the digital data acquisition system 106. The network 110 may comprise a bus between two or more of the scoring system 102, the feedback device 104, and the digital data acquisition system 106. At least a portion of the network 110 may be private. At least a portion of the network 110 may be public, such as the Internet. The network 110 may be capable of transporting messages comprising one or more messaging protocol. Network cloud 150 generally represents a network or collection of networks (such as the Internet or a corporate intranet, or a combination of both) over which the various components illustrated in FIG. 1 (including other components that may be necessary to execute the system described herein, as would be readily understood to a person of ordinary skill in the art). In particular embodiments, network 110 is an intranet, an extranet, a virtual private network (VPN), a local area network (LAN), a wireless LAN (WLAN), a wide area network (WAN), a metropolitan area network (MAN), a portion of the Internet, or another network 110 or a combination of two or more such networks 150. One or more links connect the systems and databases described herein to the network 110. In particular embodiments, one or more links each includes one or more wired, wireless, or optical links. In particular embodiments, one or more links each includes an intranet, an extranet, a VPN, a LAN, a WLAN, a WAN, a MAN, a portion of the Internet, or another link or a combination of two or more such links. The present disclosure contemplates any suitable network 110, and any suitable link for connecting the various systems and databases described herein.

The network 110 connects the various systems and computing devices described or referenced herein. In particular embodiments, network 110 is an intranet, an extranet, a virtual private network (VPN), a local area network (LAN), a wireless LAN (WLAN), a wide area network (WAN), a metropolitan area network (MAN), a portion of the Internet, or another network or a combination of two or more such networks. The present disclosure contemplates any suitable network 110.

One or more links couple one or more systems, engines or devices to the network 110. In particular embodiments, one or more links each includes one or more wired, wireless, or optical links. In particular embodiments, one or more links each includes an intranet, an extranet, a VPN, a LAN, a WLAN, a WAN, a MAN, a portion of the Internet, or another link or a combination of two or more such links. The present disclosure contemplates any suitable links coupling one or more systems, engines or devices to the network 110.

In particular embodiments, each system or engine may be a unitary server or may be a distributed server spanning multiple computers or multiple datacenters. Systems, engines, or modules may be of various types, such as, for example and without limitation, web server, news server, mail server, message server, advertising server, file server, application server, exchange server, database server, or proxy server. In particular embodiments, each system, engine or module may include hardware, software, or embedded logic components or a combination of two or more such components for carrying out the appropriate functionalities implemented or supported by their respective servers. For example, a web server is generally capable of hosting websites containing web pages or particular elements of web pages. More specifically, a web server may host HTML files or other file types, or may dynamically create or constitute files upon a request, and communicate them to clients devices or other devices in response to HTTP or other requests from clients devices or other devices. A mail server is generally capable of providing electronic mail services to various clients devices or other devices. A database server is generally capable of providing an interface for managing data stored in one or more data stores.

In particular embodiments, one or more data storages may be communicatively linked to one or more servers via one or more links. In particular embodiments, data storages may be used to store various types of information. In particular embodiments, the information stored in data storages may be organized according to specific data structures. In particular embodiment, each data storage may be a relational database. Particular embodiments may provide interfaces that enable servers or clients to manage, e.g., retrieve, modify, add, or delete, the information stored in data storage.

The system may also contain other subsystems and databases, which are not illustrated in FIG. 1, but would be readily apparent to a person of ordinary skill in the art. For example, the system may include databases for storing data, storing features, storing outcomes (training sets), and storing models. Other databases and systems may be added or subtracted, as would be readily understood by a person of ordinary skill in the art, without departing from the scope of the invention.

DETAILED DESCRIPTION OF EXEMPLARY EMBODIMENTS

Figure 2:
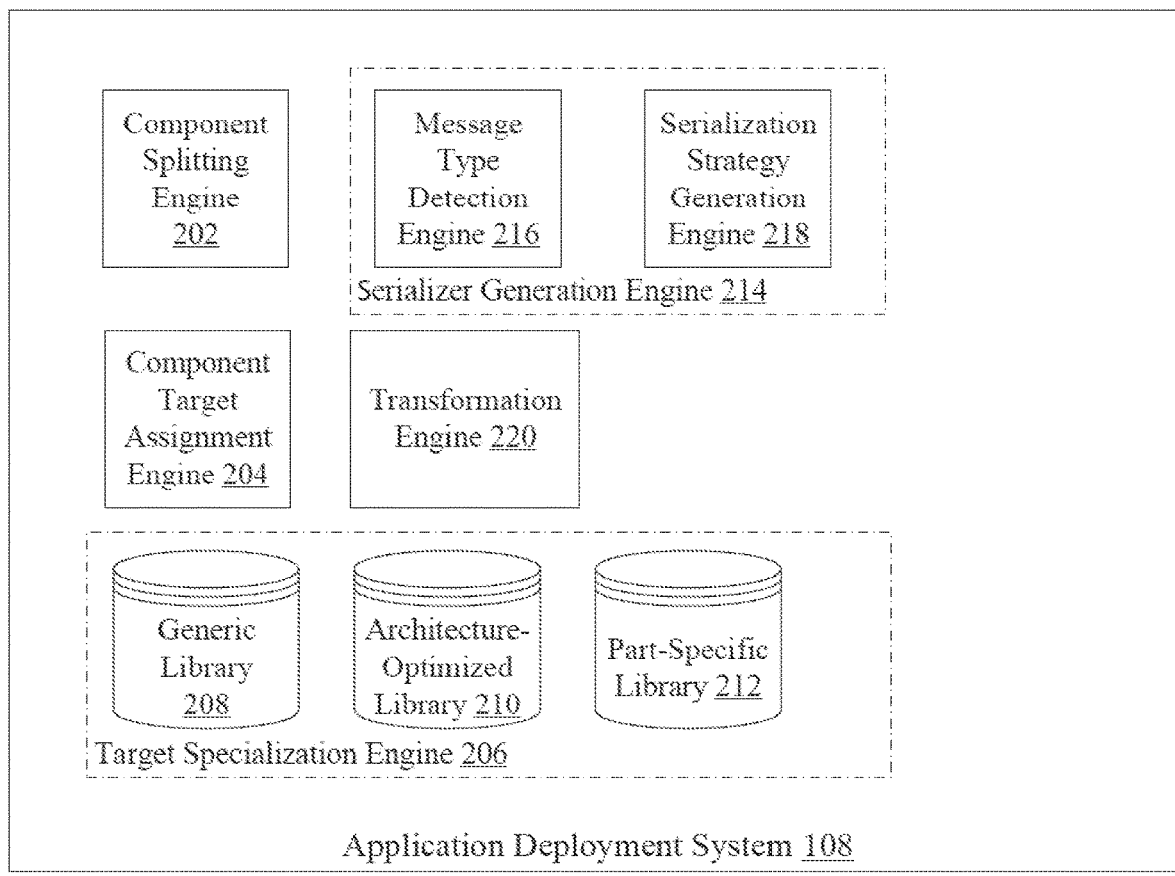
FIG. 2 is a block diagram illustrating an exemplary application deployment system, according to a preferred embodiment of the invention.

FIG. 2 illustrates an exemplary embodiment of the application deployment system 108 of FIG. 1. In one exemplary embodiment, the application deployment system 108 is comprised of a consumption engine 201, splitting engine 202, target assignment engine 204, target specialization engine 206, a serializer generation engine 214, and a transformation engine 218. As would be readily apparent to a person of ordinary skill in the art, the various modules or engines may be comprised of other sub-modules or engines and may be arranged or deployed in a variety of different engines and configuration in accordance with the description herein without departing from the scope of the present invention.

The consumption engine 201 exemplarily consumes an application specification associated with one or more devices or application in a network environment. In a general sense, an application specification may be a task/program/algorithm here that may result in an application or an instance of a device. The application specification may be comprised of security layers, relevant libraries, communication channels, and other information that may be crafted or instantiated as part of the compilation process. In one embodiment of the invention, the application specification may be source code, script based, GUI based, etc.

The splitting engine 202 exemplarily analyzes the network to identify independent components in the network. In one exemplary embodiment, the component splitting engine 202 identifies independent components by identifying message-passing boundaries and data dependencies between code paths. In one exemplary embodiment, an independent component is identified as such if it does not share a data dependency with another component.

The target assignment engine 204 exemplarily maps independent components to independent target hardware nodes. A variety of different methodologies may be used to map independent components to independent target hardware nodes. For example, the independent components may be mapped to hardware nodes based on an explicit configuration in the deployed network. For example, a user may define a set of configuration information that details the available network resources upon which the application is to be deployed. This may include a given fixed networked compute node, a networked system of homogeneous compute nodes, or a heterogeneous fixed network of compute nodes. In another example, the independent components may be mapped based on dependency on a specific target peripheral, such as dependence on specific compute or network resources, i.e., network bandwidth, certain hardware acceleration, etc. In another exemplary embodiment, the independent components may be mapped by performing various cost analysis functions. For example, the component target assignment engine 204 may identify available networked computer resources and partition the application according to a given cost criteria, such as compute performance, power consumption, bandwidth requirements, etc. Networks upon which a given target application is deployed may be fixed in terms of network architecture, may be fluid in terms of self-organizing networks, or may be varied in terms of networked swarm intelligence such as rapidly evolving systems of drone like devices.

The target specialization engine 206 exemplarily leverages the generic library 208, the architecture-optimized library 210, and/or a part-specific library 212 to generate code that is specialized for each target hardware node and/or independent component. Generally, the three libraries mentioned above, the generic library 208, the architecture-optimized library 210, and part-specific library 212, include one or more implementations that may be deployed at specific components in the network and at specific target hardware nodes. For example, the generic library 208 includes implementation code that is less specific. The part-specific library, on the other hand, includes code that is more specific. The target specialization engine 206 exemplarily selects one or more appropriate libraries for each target hardware node and selects an implementation code that is appropriate for a deployment. As such, the target specialization engine 206 exemplarily resolves proxy classes and objects against the most target-architecture and peripheral-specific implementation that may be available to it.

The serializer generation engine 214 exemplarily generates serialization and/or de-serialization code for each target's communication channel. Serialization/deserialization, as used herein, broadly refers to encoding something to go over a communication wired, wireless, or other connection. The disclosure herein is not limited to serialization as in forcing of packet orderings, and is not meant to refer to internal memory references or any specific internal memory formats. In one embodiment, the serializer generation engine 214 is comprised of a message type detection engine 216, and a serialization strategy generation engine 218. The message type detection engine 216 detects the message types that may traverse each channel from one target hardware node to another. The serialization strategy generation engine 218 identifies the security needs for the communication channel, channel configuration of one or more target hardware node. The serializer generation engine 214 uses the information provided by the message type detection engine 216 and the serialization strategy generation engine 218 to generate serialization/deserialization code for each target's communication channel.

The transformation engine 220 exemplarily transforms the consumed application specification into a format suitable for a target node. The suitable format may be determined based on analysis performed by various components of the application deployment system 108 described above and throughout the specification. In one embodiment, the transformation engine 220 may compile in a binary executable. However, more generally, the transformation engine 220 may generate an intermediate representation that is target agnostic, or other representation such as script language or other. Moreover, there may not be an explicit application code; the transformation engine 220 may generate security modules that may be deployed to the devices as part of a security layer on top of which the application code sits for a given networked node. In one embodiment, the transformation engine 220 may not generate executable code at all; rather a new configuration file may be pushed out to update access ports, or other non-executable code parts of the node.

The implementation described herein may be employed in a variety of use cases. For example, the present invention may be used to implement proceduralized security implementation. In order to do so, the application deployment system 108 may be used to update software at various target nodes, and enable communication via serialization, key handling, encryption and transport. This enables a more secure method for updating code or introducing new hardware in a heterogeneous network environment. In one embodiment, for example, the implementation of the present invention enables automatic, secure distribution of cryptographic key material. Moreover, the implementation enables distribution of encrypted, signed software updates on one or more participating nodes.

The implementation described herein may also be employed to enable integrated security administration. In this implementation, the application deployment system 108 interfaces with a user device to authenticate a user, and automatically and securely distribute crytopgraphic key material and encrypted, signed software updates to one or more components, including a key management component, a firmware repository, and/or an app server.

In one embodiment, the present invention may also be deployed in a chip architecture, such as, for example, RISC-V, but other instruction set architectures may be used, as would be readily apparent to a person of ordinary skill in the art, without departing from the scope of the invention. Such methods of designing chip architecture in the cloud may be used in fog computing by, for example, plugging in the chip architecture, running real time network traffic on it, and iteratively enabling design of software in a full stack environment. In another example, the chip architecture with the present invention implementation may be used in edge computing to evaluate real application in a network system, and rapidly redeploy the invention at edge devices.

Figure 3:
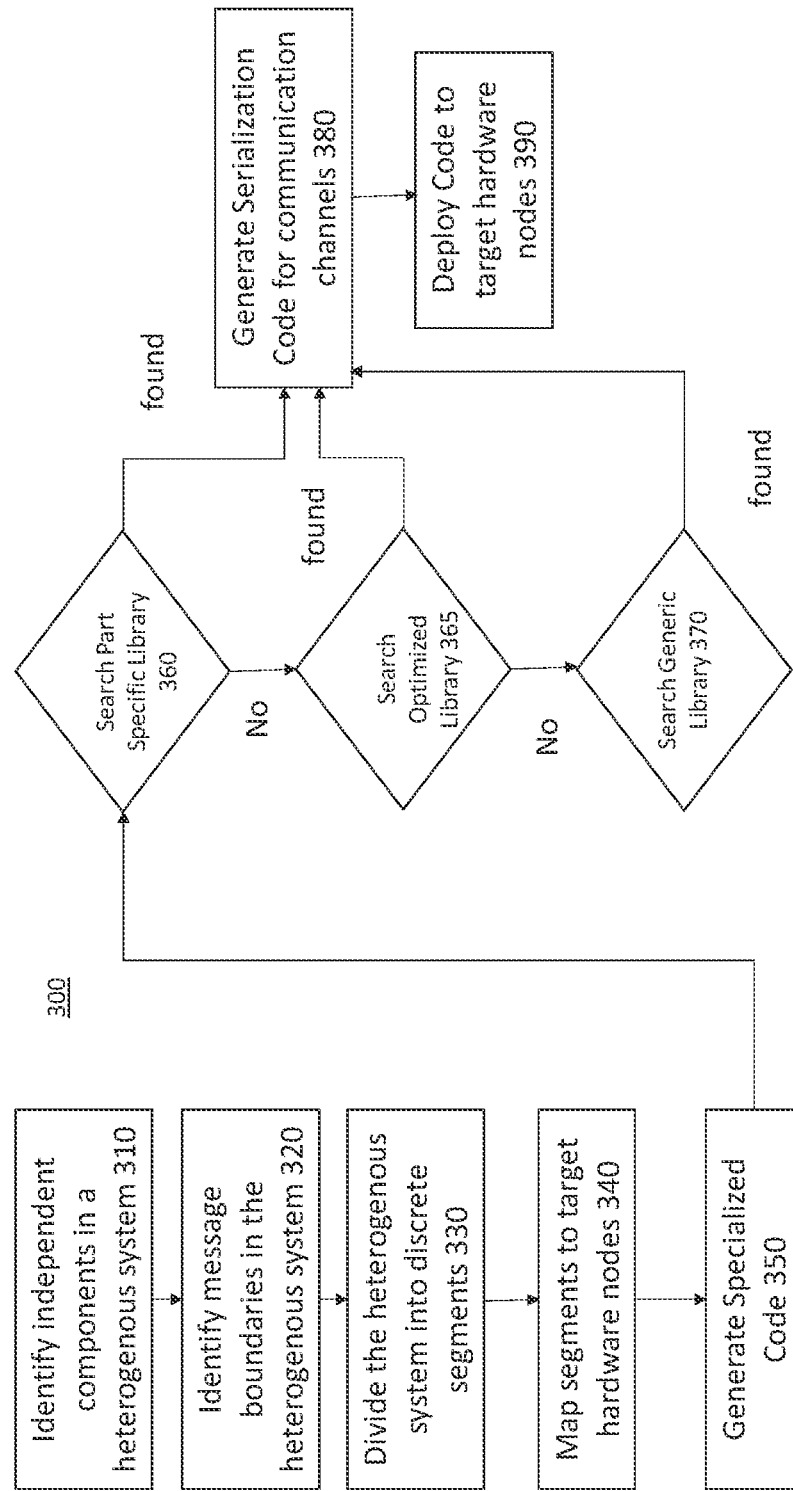
FIG. 3 is a flow diagram illustrating an example method, according to a preferred embodiment of the invention.

FIG. 3 illustrates an exemplary process 300 for deploying code automatically in a heterogenous network environment. The process typically begins by identifying independent components in a heterogenous system, such as a system composed of, for example, the sensor device 102, the gateway device 104, and server 106 exemplarily illustrated by FIG. 1. The heterogenous system can include some or all elements in an enterprise-wide network of connected devices. In one embodiment, step 320 identifies message-passing boundaries and data dependencies between code paths in the heterogenous system. In one exemplary embodiment, an independent component is identified as such if it does not share a data dependency with another component. For example, the independent components may be mapped to hardware nodes based on an explicit configuration in the deployed network. For example, a user may define a set of configuration information that details the available network resources upon which the application is to be deployed. This may include a given fixed networked compute node, a networked system of homogeneous compute nodes, or a heterogeneous fixed network of compute nodes. In another example, the independent components may be mapped based on dependency on a specific target peripheral, such as dependence on specific computer or network resource. A variety of different methods to automatically analyze an application at message passing boundaries may be applied. These can be either inserted into the application specification and/or configuration manually by a user, or performed automatically by build tools process. The information that transmits over these message passing boundaries may be messages themselves of varying types. A number of different messages can be sent, whether TCP/IP, or other higher level custom formats like XML/Javascript etc. Generally, message-boundary detection takes place remotely from the target system. The analysis for message passing boundaries is done at the build/complete stage of the process, thus done on build servers or workstations. The segmented application is then typically deployed to the target system on which the application ultimately runs. The build system may be a separate machine from the target system on which the application is deployed, but, as may be appreciated by persons of ordinary skill in the art, they may not be.

Once an independent component is identified, it is separated in step 330 from other components by a message-passing boundary to exemplarily divide the heterogenous system into discrete segments. Thereafter, the process continues by mapping independent components to independent target hardware nodes in step 340. A variety of different methodologies may be used to map independent components to independent target hardware nodes, including the one noted above in reference to FIG. 2.

The process continues to step 350 by generating code that is specialized for each target hardware node and/or discrete component to allow communication with a target communication node of the divided system. Exemplarily, a variety of different libraries may be used to deploy appropriately generic or specific code at a variety of different target hardware nodes. As such, the process resolves proxy classes and objects against the most target-architecture and peripheral-specific implementation that may be available to it. In one exemplary embodiment, the process generates code by retrieving sample codes from a library and then applying the identified variables making up the data communicated through communication boundaries. Exemplarily, the most specific code that can be determined is selected. The generating of specialized code can first include searching part specific libraries as exemplarily illustrated in step 360. If a part specific code can be found, method 300 proceeds to step 380. If no part specific code is found in step 360, step 365 exemplarily searches for an architecture optimized code from an architecture optimized library. If such a code is found, method 300 proceeds then to step 380. If no appropriate code is found in step 365, method 300 proceeds to step 370 where generalized code is retrieved from a generic library. If no code is found at step 370, then a build/link time error may occur.

In some embodiments, each of steps 360, 365, and 370 are performed for each discrete segment to return all available coding options. Additionally, in some embodiments, various cost analysis functions can be applied to decide, in step 350, which code can be provided to step 380. Exemplarily, in step 380, serialization and de-serialization code is generated for each discrete component as required. In some instances, a terminal device may only need to develop a single serialization/deserialization code for that discrete segments target's communication channel. In one embodiment, the process detects a message type that may traverse each channel from one target hardware node to another, and/or the security needs for the communication channel, channel configuration of one or more target hardware node. This information is used to generate serialization/deserialization code for each target's communication channel. For example, the types of data and message types crossing the boundaries are instantiated and applied to that code.

Exemplarily, the code may thereafter be deployed in step 390 at a one or more target hardware nodes in accordance with one or more embodiments of the invention. In some embodiments, the deployment can be applied to individual discrete elements of the heterogenous system, entire branches or paths of the network, or across an enterprise-level deployment. In some embodiments, the deployment can include various security steps, including distributing keys and encryption codes, that would allow, for example, the application deployment system 108 to distribute serialization codes, de-serialization codes, programming updates, work assignments, removal of nodes, and addition of nodes.

Figure 4:
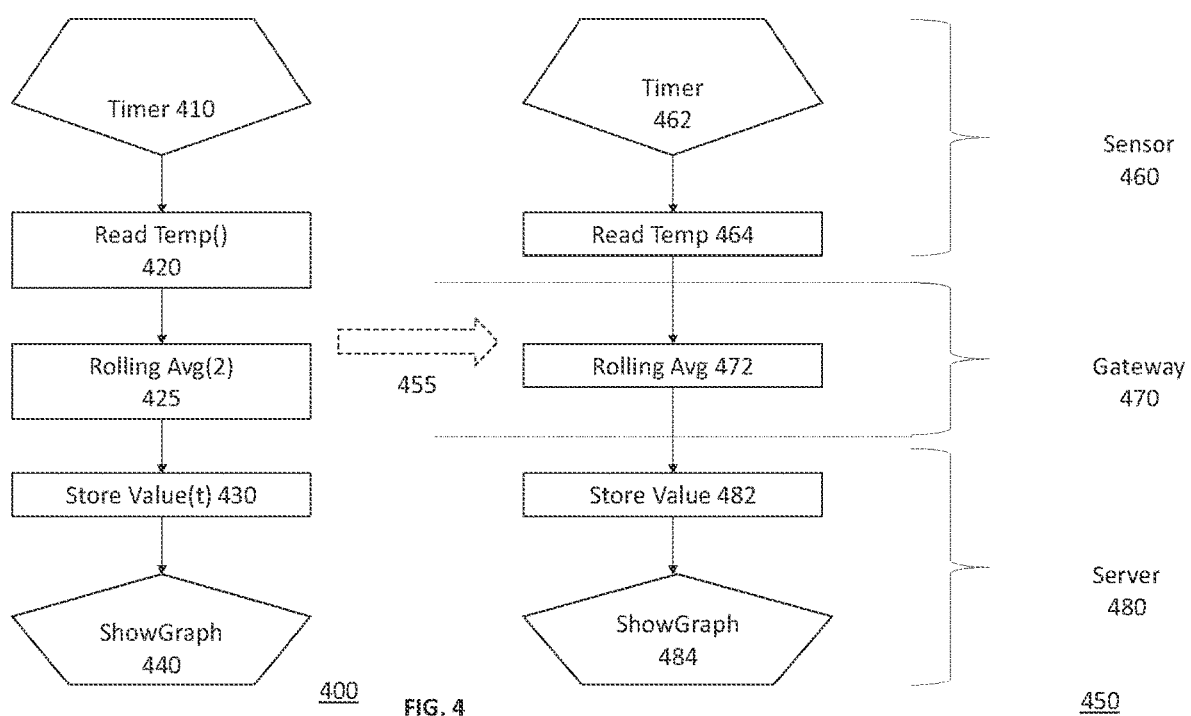
FIG. 4 is an exemplary illustration of the present invention in a deployment configuration.

FIG. 4 illustrates an exemplary illustration of a heterogeneous system 400. Heterogenous system 400 can perform several tasks employing several devices employed within the system. Exemplarily the system heterogeneous system 400 can include upstream and downstream connected devices, such as the exemplary sensor system illustrated in FIG. 1. In other embodiments, the heterogeneous system 400 can include many different servers, gateways, and downstream devices across an enterprises-wide system including many different devices. Thus, in one example, an oil field that employs countless sensors and gateway devices can be controlled and updated as desired. Exemplarily, the heterogeneous system 400, in accordance with an embodiment of the invention, can be analyzed and divided into three separate instances as exemplarily illustrated in segmented system 450. Referring to method 300 illustrated in steps 310, 320, and 330 within FIG. 3, the individual components of the heterogeneous system 400 are identified and divided into the discrete segments of the segmented system 450. In one embodiment, the components within the heterogeneous system 400 can be identified based on locating message-passing boundaries and data-dependencies within the heterogeneous system 400.

Exemplarily, components and programs within the heterogeneous system 400 are analyzed, as represented by arrow 455, for message-passing boundaries and data dependencies between code paths. An independent component of the heterogeneous system 400 exemplarily can be separated from other components based on the identified message-passing boundary. In addition, an identified component can be determined based on its data dependency. Exemplarily, an identified component will share no data dependency with other components within the heterogeneous system 400. In additional embodiments, once independent components of the heterogeneous system 400 are identified, they can be mapped to independent target hardware nodes based on the application configuration. Exemplarily, the mapping of components to these targets can be determined by an explicit configuration of the heterogeneous system 400 or by determining a component dependency based on a specific target peripheral.

In one embodiment, the heterogeneous system 400 can represent a temperature monitoring system which exemplarily measures a temperature of an environment over time and provides a graph of that temperature versus time. In this example, the heterogeneous system 400 can include a timer 410 which triggers a temperature sensor that provides a read temperature value 420. The read temperature value 420 can be used to exemplarily create a rolling average value 425 which can then be stored as a stored value 430. In this embodiment, the stored value 430 can be analyzed to exemplarily provide a graph in the Showgraph function 430. Exemplarily, the Showgraph function 430 output is served or transmitted to a user client device.

Exemplarily, in accordance with an embodiment of this invention, the heterogeneous system 400 can be analyzed, as represented by arrow 455, to determine message boundaries and individual components. Based on this analysis, different segments within the heterogeneous system 400 can be identified as exemplarily illustrated in the segmented system 450. Within the segmented system 450, the identified components can include a sensor 460, a gateway device 470, and a server 480. In other exemplary embodiments, any number of target configurations and identified components can be recognized from the heterogenous device being considered. In this exemplary embodiment, the sensor 460 can include a timer function 462 and read temperature function 464. The gateway 470 can include a rolling average function 472 while the server 480 can perform a storing value function 482 and a graph, such as a "Showgraph", function 484.

Figure 5:
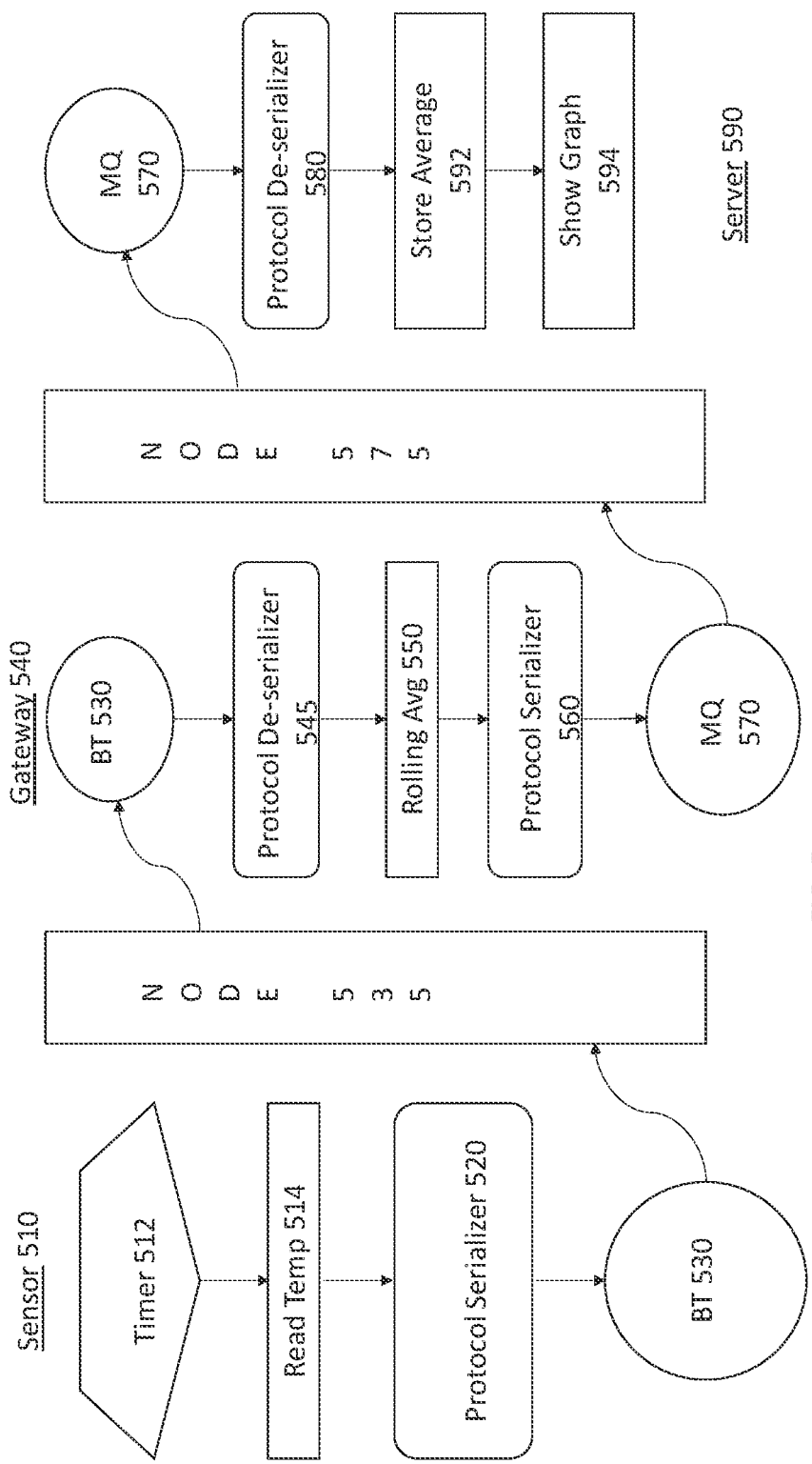
FIG. 5 is an exemplary illustration of the present invention in a deployment configuration.

FIG. 5 illustrates an exemplary illustration of the generation of code for intra-node message-passage boundaries that were identified for the segmented system 450 of FIG. 4. Exemplarily, FIG. 5 illustrates a build of intermediate code that is deployed to physical nodes between these boundaries. FIG. 5 illustrates the communication between sensor portion 510, gateway 540, and server 590 that comprise the segmented system 450. Within the sensor portion 510, the similar functions of the heterogeneous system 400 from FIG. 4 are employed in the timer function 512 and read temperature function 514. Next, within the sensor portion 510, a protocol serializer 520 is employed to provide an output, such as a Bluetooth message, although any message interface or process may be used, BT output 530, across the node 535 identified between the sensor 510 and the gateway 540. In other embodiments, different communication modes can be employed, from exemplary wired connections to various wireless communication paths.

Next, the BT output 530 is received at gateway 540 and is de-serialized at de-serializer 545. Next, the rolling average function 550 is performed within the gateway 540 and then that value is serialized in the gateway protocol serializer 560 to create an output, such as message via a Message Queuing Telemetry Transport pathway, or MQ 570, although any message interface or process may be used. The message MQ 570 is then transported across the node 575 between gateway 540 and server 590. At the server 590, the MQ message 570 is received and de-serialized at the protocol de-serializer 580. The server 590 then uses these values at the store average function 592 and can perform the show graph function 594. That is, referring to method 300 illustrated within FIG. 3, specialized code is created, including a serialization and de-serialization code for each communication channel between the target hardware nodes. Exemplarily, once individual components of a heterogenous system are identified, the components are mapped to independent target hardware nodes based on the application configuration. In other embodiments, different communication modes can be employed, from exemplary wired connections to various wireless communication paths.

Referring to method 300 of FIG. 3, where in step 390 the resulting code is deployed. FIG. 5 exemplarily illustrates the deployment of code where intermediate code generated in step 350 of FIG. 3 can be deployed to each physical node such as sensor 510, gateway 540, and server 590 of FIG. 5 to perform message serialization/deserialization by protocol serializer 520 and 560 and protocol de-serializer 545 and 580 between each node of the identified nodes 535 and 575. Exemplarily, the message types and data crossing each boundary is identified and incorporated into the message serialization/deserialization protocols. In some examples, the BT message 530 would include the temperature data collected by the sensor 510. In other examples, the MQ message 570 includes data such as the rolling average compiled by the gateway 540. In other embodiments, the gateway 540 would collect rolling averages from one or more sensors and communicate that data through message MQ 570 to the server. Exemplarily, by identifying these nodes, updates to the various identified components including adding new components between the identified components, or changing the work being performed at each component can be accomplished without modifying each application's code.

As discussed above with respect to FIG. 1, the application deployment system 108 can exemplarily generate code that can be deployed at the sensor 510, gateway 540, and server 590 of FIG. 5. Exemplarily, the code can include serialization code that is synthesized for each intra-node message-passing boundary between the sensor 510, gateway 540, and server 590. Additionally, newly added devices can be added between pre-existing nodes by simply re-coding the identified protocol serializer 520 and 560 and protocol de-serializer 545 and 580 for the existing devices so as to adapt to newly updated code, newly added devices, or changes to the operation of intermediate devices in the heterogenous system.

Figure 6:
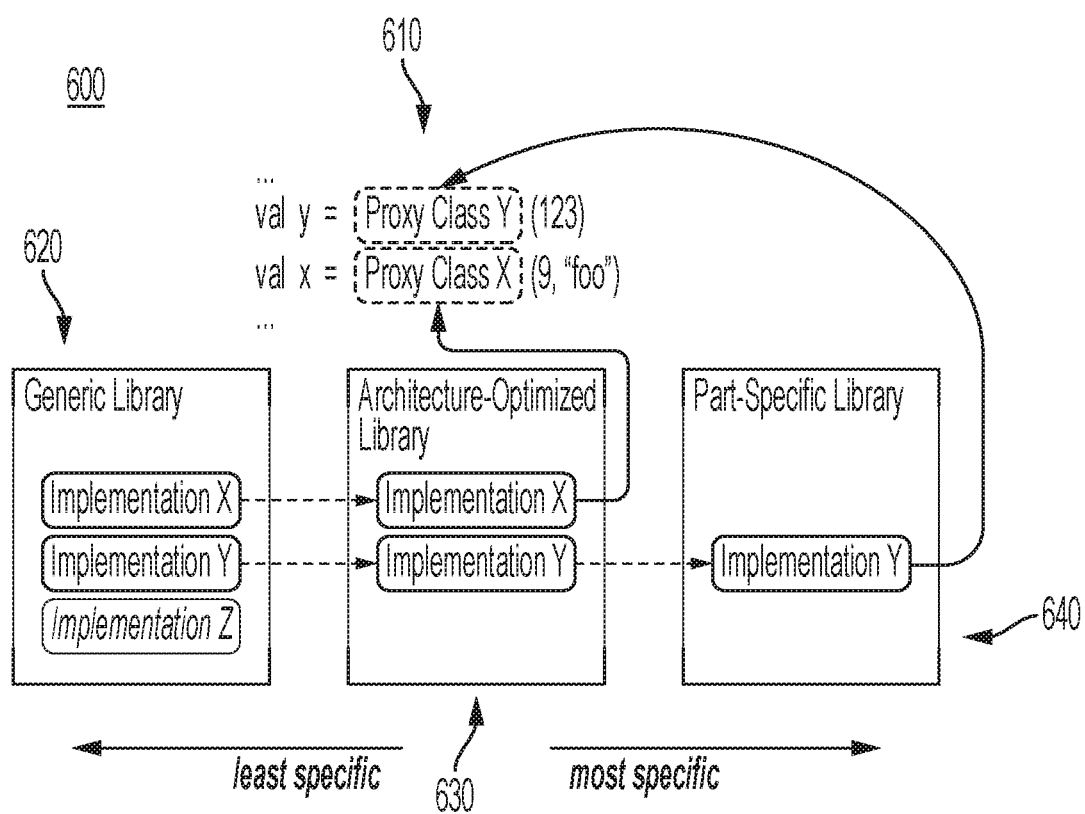
FIG. 6 is an exemplary illustration of the present invention employing a code library.

FIG. 6 illustrates an exemplary example of resolving proxy classes and objects for the identified components. Exemplarily, the resulting code 610 can be identified and generated from the various libraries including a generic library 620, an architecture-optimized library 630, and a part-specific library 640 to result in the most target architecture and peripheral specific implementation possible. In this example, the libraries arranged from a least specific and generic version of code in the generic library 620 to the more specific, the architecture-optimized library 630, and to the most specific, the part-specific library 640. In the example presented within FIG. 6, the code for proxy class Y can be found in all three libraries, and accordingly, the most specific code from the part-specific library is chosen. On the other hand, the code for proxy class X is only available in two of the three libraries, and in this instance the more specific code from the architecture-optimized library 630 is chosen.

Figure 7:
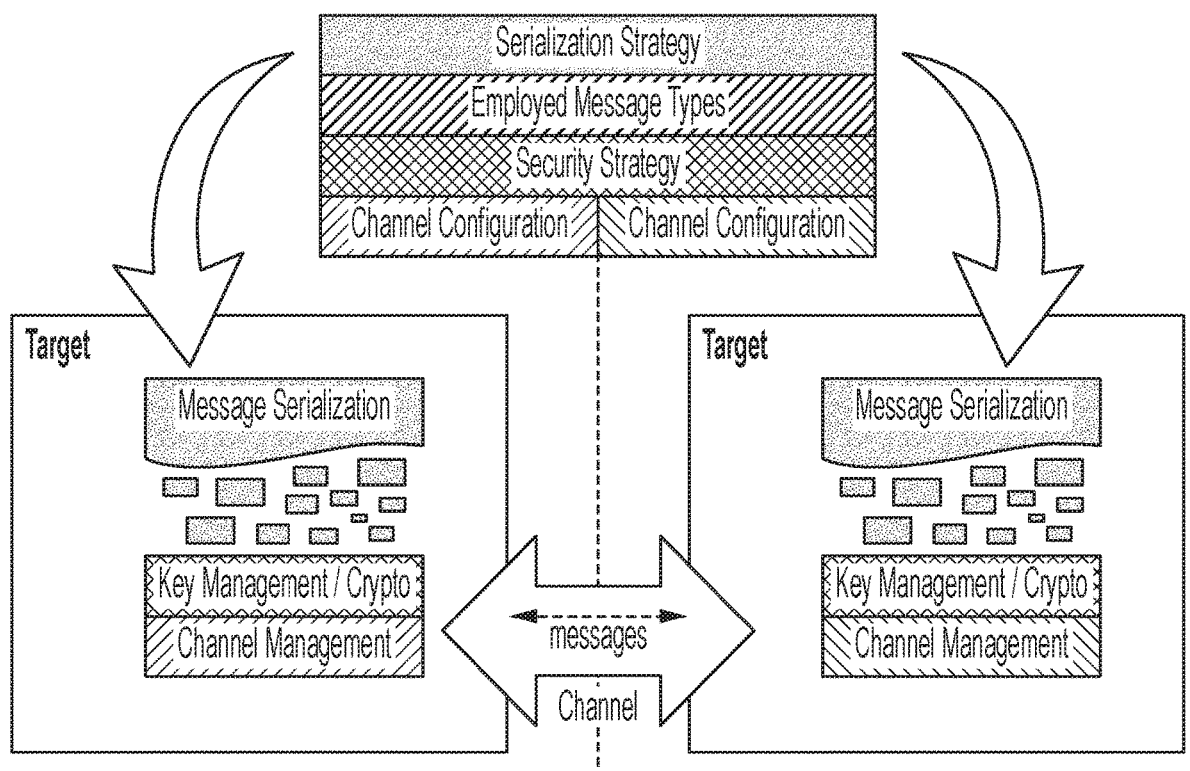
FIG. 7 is an exemplary illustration of the present invention applying a serialization/deserialization strategy.

FIG. 7 illustrates an exemplary serialization strategy that can be employed, for example, in the generating serialization/deserialization code step 310 of method 300 in FIG. 3. FIG. 7 illustrates a serialization strategy for generating a communication channel serialization/deserialization strategy can be based on a shared target communication channel capabilities and configuration to connect the nodes between identified components. Exemplarily, by leveraging a knowledge of channel implementation and the message types that will traverse each channel, a strategy for serialization/deserialization can be generated. In addition, a security strategy can be considered in creating the serialization/deserialization strategy.

Exemplarily, the messages that cross the channel between the exemplary two targeted components includes the message serialization itself, a security strategy as illustrated by the Key Management and/or cryptologic method employed between the targeted components. Exemplarily, the channel configuration can inform the channel management protocols between the targeted components which would allow for the control and security of downstream components by a central device, such as a customer controlling and updating its downstream IoT devices.

Figure 8:
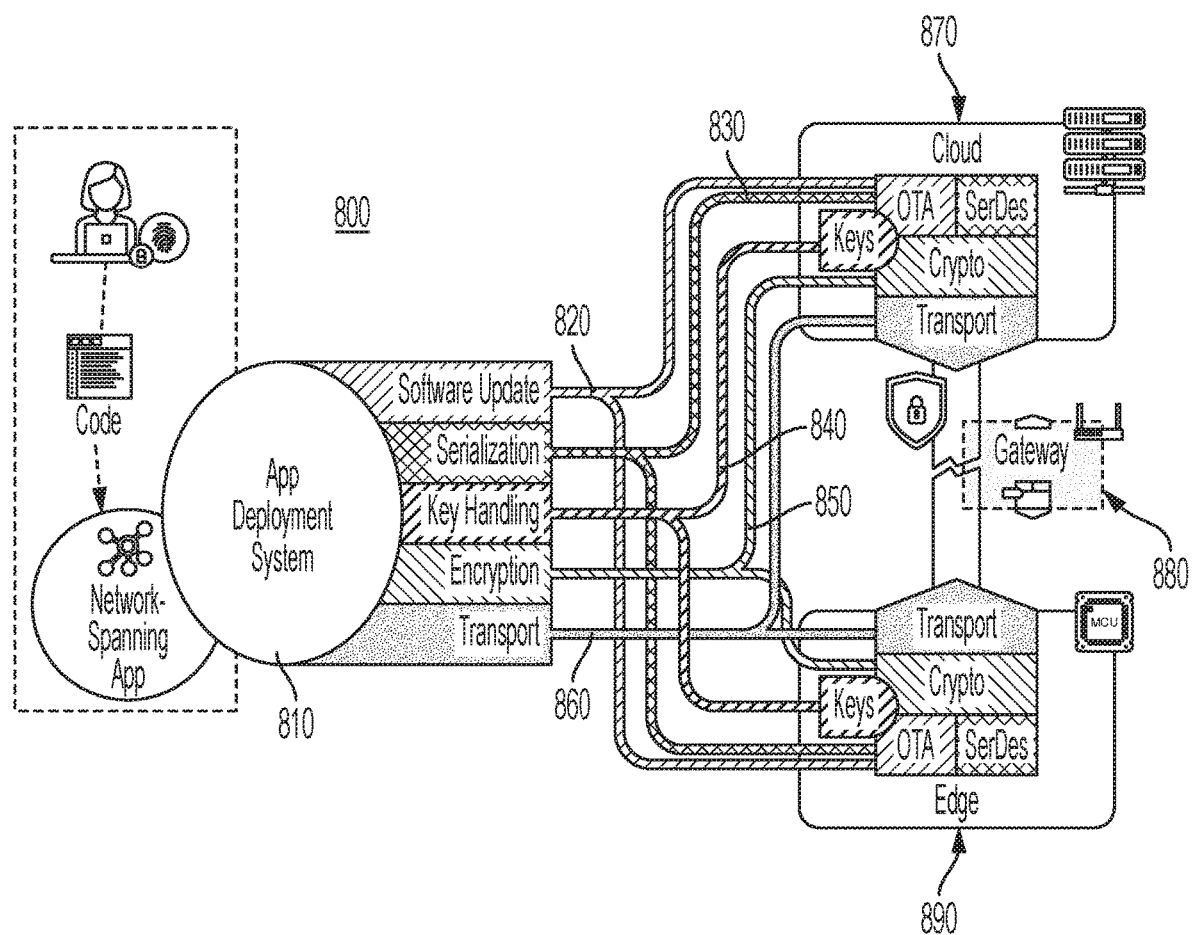
FIG. 8 is an exemplary illustration of the present invention deploying code to downstream elements of a system in accordance with the method of FIG. 3.

FIG. 8 provides an exemplary illustration of a system and method 800 for deploying the various codes, including serialization and de-serialization codes as described above in step 390 of FIG. 3. Additionally, in some embodiments, additional code, such as updated code affecting the programming of individual components in the divided system may be applied to the various individual components of the divided system. In other embodiments, additional target components can be added or removed from the system as desired. Exemplarily, the application deployment system 810, similar to the application deployment system 108 described in FIG. 1 can control the process of deploying updated code, including serialization and de-serialization codes to the discrete components of the heterogenous system that was divided in step 330, for example, in method 300 of FIG. 3.

Exemplarily, the application deployment system 810 can include various upstream, administrative control and programming apparatus and management tools. The application deployment system 810 includes the coding and other components as exemplarily described in FIG. 2 as well as other heterogenous system management personnel and systems that control the heterogenous system. In one embodiment, software updates 820 for each, or individual, target components of the divided system can be generated at the application deployment system 810 and applied to downstream components, such as cloud server 870, which can be similar to server 590 of FIG. 5, server 480 of FIG. 4, and server 106 of FIG. 1. Additionally, software updates 820 for each, or individual, target components of the divided system can be generated at the application deployment system 810 and applied to downstream components, such as gateway 880, similar to gateway 540 of FIG. 5, gateway 470 of FIG. 4, and gateway 104 of FIG. 1. Additionally, software updates 820 for each, or individual, target components of the divided system can be generated at the application deployment system 810 and applied to downstream components, such as an edge device 890, which can be considered like the sensor 540 of FIG. 5, sensor 460 of FIG. 4, and sensor 102 of FIG. 1.

In one embodiment, serialization codes 830, including serialization and de-serialization codes 830, for each, or individual, target components of the divided system can be generated at the application deployment system 810 and applied to downstream components, such as cloud server 870, like server 590 of FIG. 5, server 480 of FIG. 4, and server 106 of FIG. 1. Additionally, serialization codes 830 for each, or individual, target components of the divided system can be generated at the application deployment system 810 and applied to downstream components, such as gateway 880, similar to gateway 540 of FIG. 5, gateway 470 of FIG. 4, and gateway 104 of FIG. 1. Additionally, serialization codes 830 for each, or individual, target components of the divided system can be generated at the application deployment system 810 and applied to downstream components, such as an edge device 890, which can be considered similar to the sensor 540 of FIG. 5, sensor 460 of FIG. 4, and sensor 102 of FIG. 1.

In another embodiment, key handling information 840, exemplarily providing security and authorized access that is exemplarily controlled by the application deployment system 810, for each, or individual, target components of the divided system can be generated at the application deployment system 810 and applied to downstream components, such as cloud server 870, similar to server 590 of FIG. 5, server 480 of FIG. 4, and server 106 of FIG. 1. Additionally, key handling information 840 for each, or individual, target components of the divided system can be generated at the application deployment system 810 and applied to downstream components, such as gateway 880, which can be conceptually similar to gateway 540 of FIG. 5, gateway 470 of FIG. 4, and gateway 104 of FIG. 1. Likewise, key handling information 840 for each, or individual, target components of the divided system can be generated at the application deployment system 810 and applied to downstream components, such as an edge device 890, which is comparable to the sensor 540 of FIG. 5, sensor 460 of FIG. 4, and sensor 102 of FIG. 1.

In additional embodiments, encryption codes 850, exemplarily ensuring that the update and access to the various discrete components of the heterogenous system is exemplarily controlled by the application deployment system 810, for each, or individual, target components of the divided system can be generated at the application deployment system 810 and applied to downstream components, such as cloud server 870, similar to server 590 of FIG. 5, server 480 of FIG. 4, and server 106 of FIG. 1. Similarly, the key handling information 840 can be used to gain, for example, access to the encryption codes 850 to access the various software updates 820, serialization, and de-serialization codes 830, exemplarily being received via the transmission or transport step 860, described below. Additionally, encryption codes 850, for each, or individual, target components of the divided system can be generated at the application deployment system 810 and applied to downstream components, such as gateway 880, comparable to gateway 540 of FIG. 5, gateway 470 of FIG. 4, and gateway 104 of FIG. 1. Likewise, encryption codes 850, for each, or individual, target components of the divided system can be generated at the application deployment system 810 and applied to downstream components, such as an edge device 890, which can be considered like the sensor 540 of FIG. 5, sensor 460 of FIG. 4, and sensor 102 of FIG. 1.

In another embodiment, the application deployment system 810 performs a transmission or transport step 860 that is exemplarily controlled by the application deployment system 810 to provide the various serialization codes, programming, and other instructions for each, or individual, target components of the divided system can be generated at the application deployment system 810 and applied to downstream components, such as cloud server 870, similar to server 590 of FIG. 5, server 480 of FIG. 4, and server 106 of FIG. 1. Additionally, the transport step 860 communicates with each, or individual, target components of the divided system from the application deployment system 810 and applied to downstream components, such as gateway 880, similar to gateway 540 of FIG. 5, gateway 470 of FIG. 4, and gateway 104 of FIG. 1. Likewise, the transport step 860 communicates with each, or individual, target components of the divided system from the application deployment system 810 and applied to downstream components, such as an edge device 890, which can be considered similar to the sensor 540 of FIG. 5, sensor 460 of FIG. 4, and sensor 102 of FIG. 1.

Exemplarily, in system 800, the heterogenous system 400 of FIG. 4, for example, can be analyzed and divided as exemplarily illustrated in method 300 of FIG. 3. The application deployment system 810 can then update the downstream components, such as edge device 870, gateway 880, and server 890 with updated code, division of work, and the addition or removal of components to the heterogenous system. In some embodiments, any number of servers 890 may be updated while a potentially unlimited gateway devices 880 and downstream components, such as a large-scale sensing operation comprising potentially unlimited downstream sensors and other components, such as the edge device 870, can be updated and controlled by the application deployment system 810.

Figure 9:
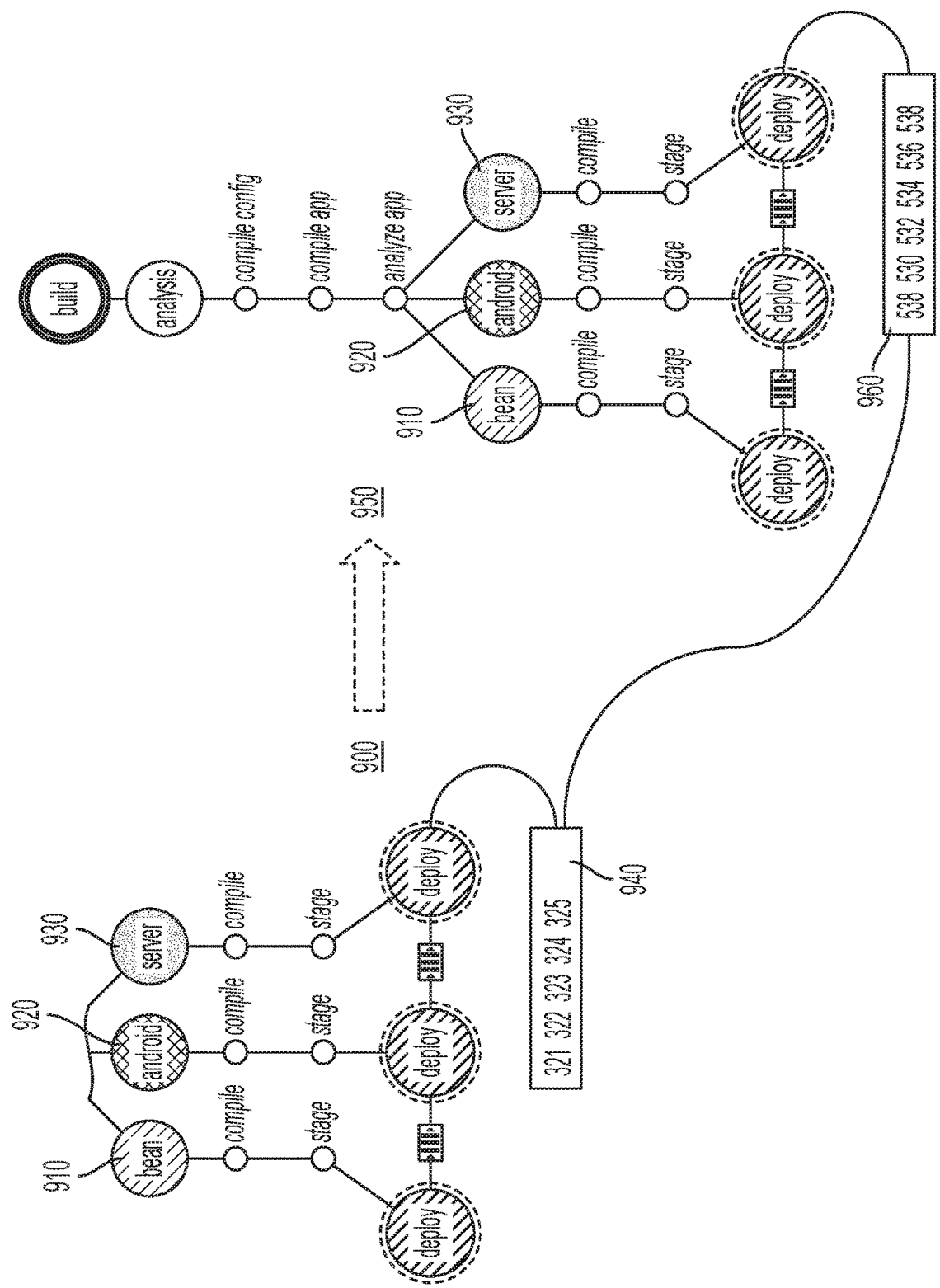
FIG. 9 is an exemplary illustration of the present invention deploying code to downstream elements of a system in accordance with the method of FIG. 3 and system of FIG.

FIG. 9 is an exemplary illustration of an embodiment the present invention deploying code to downstream elements of system 900 in accordance with method 300 of FIG. 3. System 900 exemplary illustrates a heterogenous system including a sensor device 910, a gateway 920, and server 930. These three elements exemplarily perform separate tasks to generate an output illustrated in element 940. In accordance with method 300 of FIG. 3 and utilizing, for example, system 800 of FIG. 8 where an application deployment system 810 can exemplarily update the operation of system 900. In this example, the heterogenous system has been analyzed in accordance with method 300 to determine the individual components. Referring to FIG. 8, software updates 820 have been developed and compiled to be distributed to the updated system 950 of FIG. 9. In this example, the software updates are distributed to sensor device 910, gateway 920, and server 930 to perform updated operations resulting in modified output 960 from updated system 950.

In the example of updating system 900, the previous programming can be represented as shown in table 1 below where the sensor device 910 was previously programmed to perform a timing task and to then output that value. The gateway 920 adds the value of 20 to that value while the server 930 adds a value of 300 to that value.

TABLE 1

```
tag ('sensor') {
    Sampler (2 seconds) ->
        triggered {
            new {
                private var i = 0
                def apply ( ): R[Int] = {i += 1; } % 10
            }
        }
} ->
tag ('gateway') {
    {x: R[Int] = > 20 + x }
} ->
tag ('server') {
    { x: R[Int] = > 300 + x }
} ->
tag ('output') {
    sink { x: R[Int] = > println(x) }
}
```

Next, in the example of reprogramming the elements of system 900 to provide the updated system 950, table 2 illustrates the newly added code. The newly added code instructs the sensor device 910 to perform a timing task, multiply that value by 2 and to then output that value. The gateway 920 is now instructed to add the value of 30 to that value while the server 930 now adds a value of 500 to that value. This allows exemplary embodiments of the invention to provide changes to system 900 that ultimately changes the output 940 of a series of numbers of 321 through 329 to the modified output 960 of a series of values starting at 530 and stepping by a value of two to 538.

TABLE 2

```
tag ('sensor') {
    Sampler (1 seconds) ->
        triggered {
            new {
                private var i = 0
                def apply ( ): R[Int] = {i += 2; i} % 10
            }
        }
} ->
tag ('gateway') {
    {x: R[Int] = > 30 + x }
} ->
tag ('server') {
    { x: R[Int] = > 500 + x }
} ->
tag ('output') {
    sink { x: R[Int] = > println(x) }
}
```

Figure 10:
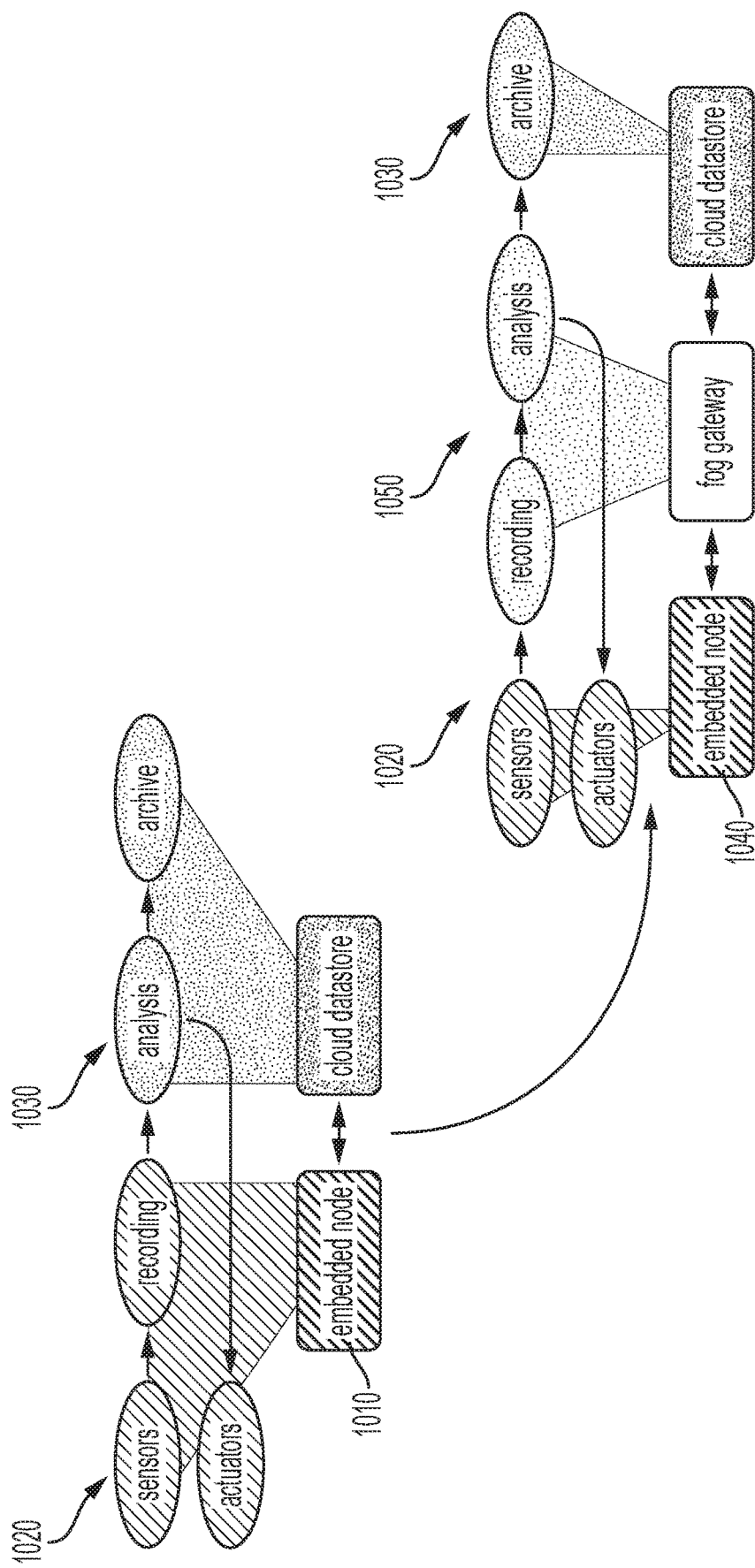
FIG. 10 is an exemplary illustration of the present invention deploying code to downstream elements of a system in accordance with the method of FIG. 3 and system of FIG. 8.

FIG. 10 is another exemplary illustration of an embodiment the present invention deploying code to downstream elements of system 1010 in accordance with method 300 of FIG. 3. In this example, system 1010 is a heterogenous system that is composed of an embedded node 1020 and cloud database 1030. Exemplarily, the embedded node 1020 performs a sensing and recording function while the cloud database 1030 performs an analysis and archive function. After performing the elements of method 300 of FIG. 3 and being distributed via the application deployment system 810 of FIG. 8, system 1010 has been updated into updated system 1040. In the updated system 1040, a fog gateway 1050 has been added to the heterogenous system of system 1010. In updated system 1040, the fog gateway 1050 has been assigned the recording and analysis tasks while the embedded node 1020 has been assigned the sensing functions and the cloud database 1030 retains its archive function. In other embodiments, additional elements can be added or removed from system 1010 in any combination of newly added functions and devices.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or other appropriate virtual environments).

Figure 11:
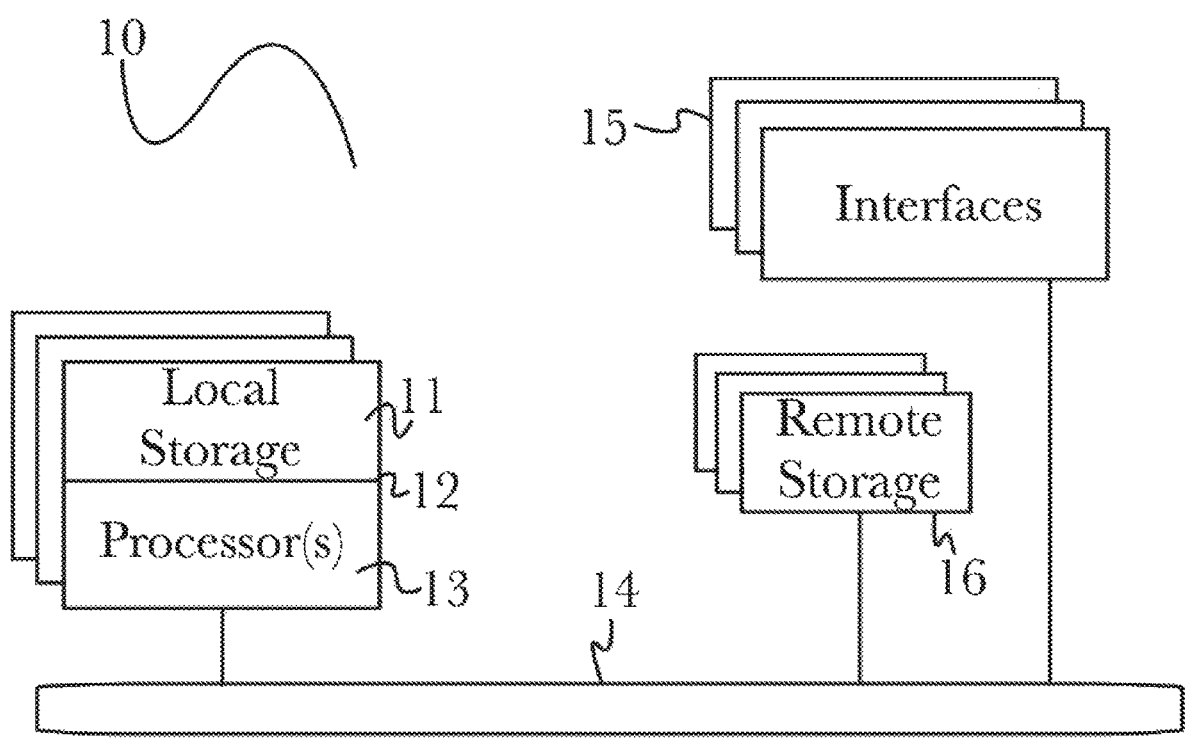
FIG. 11 illustrates one embodiment of components of an example machine able to read instructions from a machine-readable medium and execute them in a processor (or controller).

Referring now to FIG. 11, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one aspect, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one aspect, a computing device 10 may be configured or designed to function as a server system utilizing CPU 12, local memory 11 and/or remote memory 16, and interface(s) 15. In at least one aspect, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some embodiments, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a particular aspect, a local memory 11 (such as non-volatile random-access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a QUALCOMM SNAPDRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one aspect, interfaces 15 are provided as network interface cards (NICs). Generally, NICs control the sending and receiving of data packets over a computer network, other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 11 illustrates one specific architecture for a computing device 10 for implementing one or more of the embodiments described herein, it is by no means the only device architecture on which at least a portion of the features and techniques described herein may be implemented. For example, architectures having one or any number of processors 13 may be used, and such processors 13 may be present in a single device or distributed among any number of devices. In one aspect, single processor 13 handles communications as well as routing computations, while in other embodiments a separate dedicated communications processor may be provided. In various embodiments, different types of features or functionalities may be implemented in a system according to the aspect that includes a client device (such as a tablet device or smartphone running client software) and server systems (such as a server system described in more detail below).

Regardless of network device configuration, the system of an aspect may employ one or more memories or memory modules (such as, for example, remote memory block 16 and local memory 11) configured to store data, program instructions for the general-purpose network operations, or other information relating to the functionality of the embodiments described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 12:
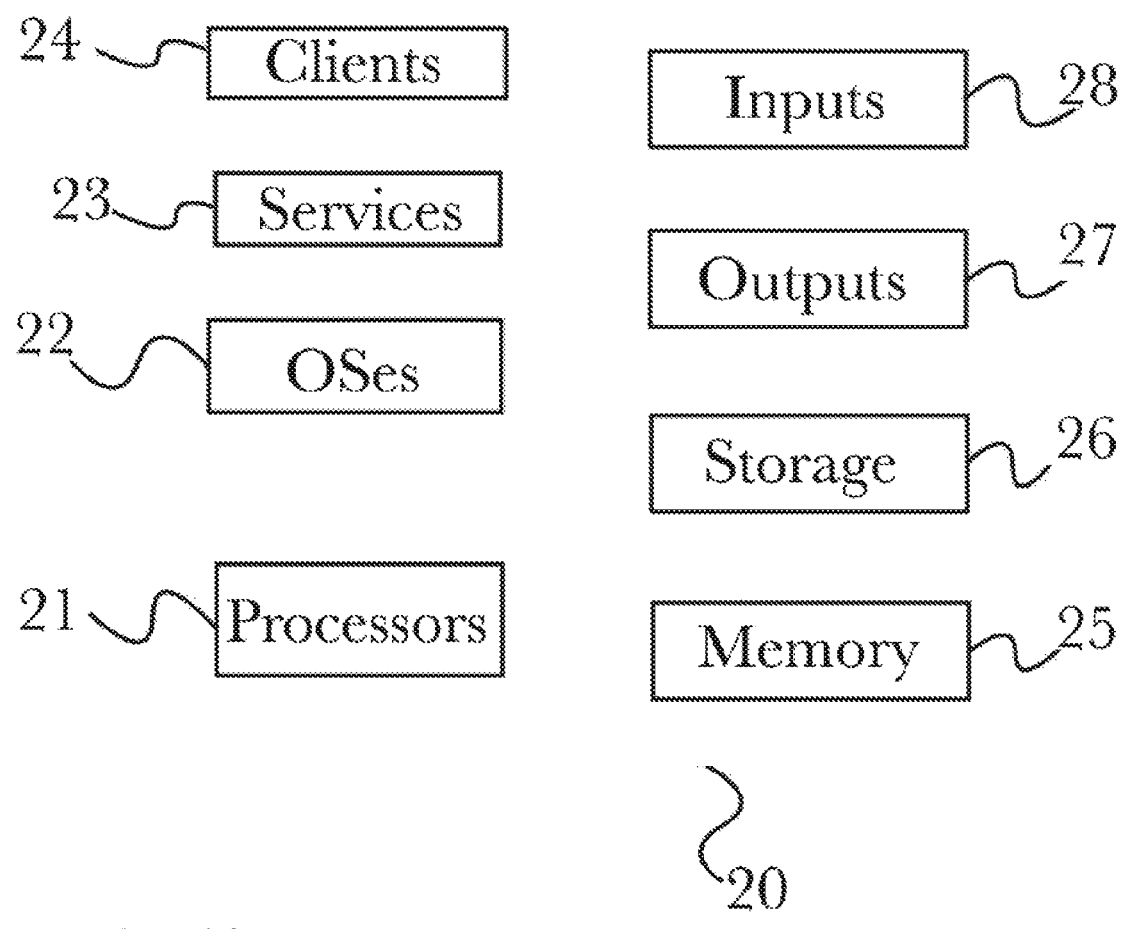
FIG. 12 illustrates on embodiment of the computing architecture that supports an embodiment of the inventive disclosure.

In some embodiments, systems may be implemented on a standalone computing system. Referring now to FIG. 12, there is shown a block diagram depicting a typical exemplary architecture of one or more embodiments or components thereof on a standalone computing system. Computing device 20 includes processors 21 that may run software that carry out one or more functions or applications of embodiments, such as for example a client application 24. Processors 21 may carry out computing instructions under control of an operating system 22 such as, for example, a version of MICROSOFT WINDOWS™ operating system, APPLE macOS™ or iOS™ operating systems, some variety of the Linux operating system, ANDROID™ operating system, or the like. In many cases, one or more shared services 23 may be operable in system 20, and may be useful for providing common services to client applications 24. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 5). Examples of storage devices 26 include flash memory, magnetic hard drive, CD-ROM, and/or the like.

Figure 13:
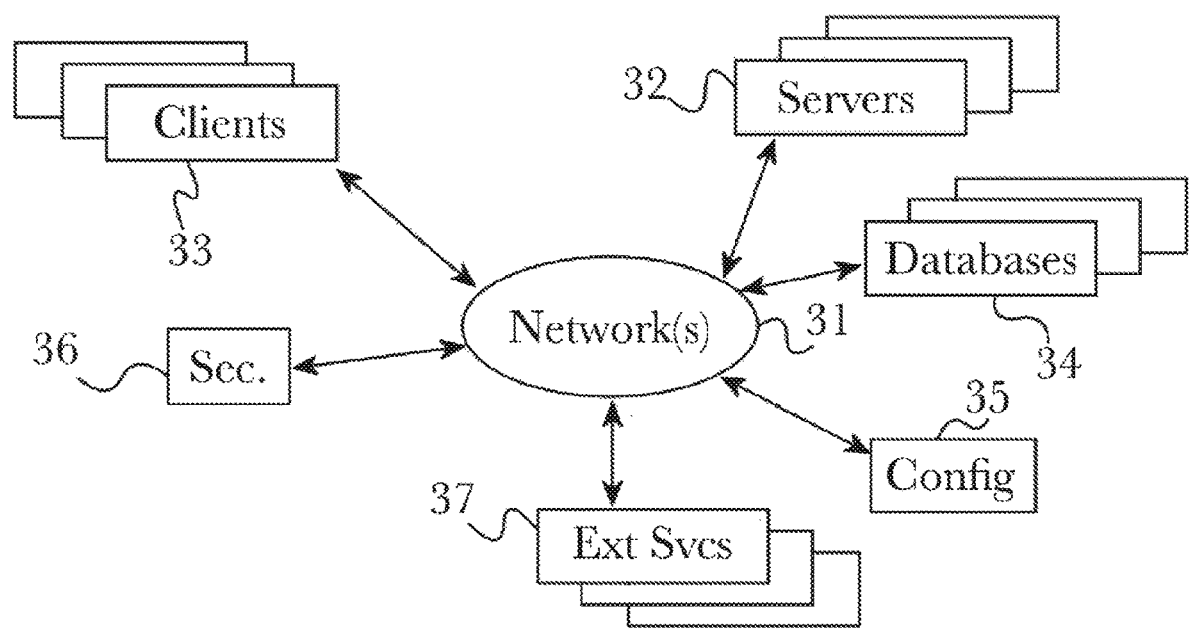
FIG. 13 illustrates components of a system architecture that supports an embodiment of the inventive disclosure.

In some embodiments, systems may be implemented on a distributed computing network, such as one having any number of clients and/or servers. Referring now to FIG. 13, there is shown a block diagram depicting an exemplary architecture 30 for implementing at least a portion of a system according to one aspect on a distributed computing network. According to the aspect, any number of clients 33 may be provided. Each client 33 may run software for implementing client-side portions of a system; clients may comprise a system 20 such as that illustrated in FIG. 6. In addition, any number of servers 32 may be provided for handling requests received from one or more clients 33. Clients 33 and servers 32 may communicate with one another via one or more electronic networks 31, which may be in various embodiments any of the Internet, a wide area network, a mobile telephony network (such as CDMA or GSM cellular networks), a wireless network (such as WiFi, WiMAX, LTE, and so forth), or a local area network (or indeed any network topology known in the art; the aspect does not prefer any one network topology over any other). Networks 31 may be implemented using any known network protocols, including for example wired and/or wireless protocols.

In addition, in some embodiments, servers 32 may call external services 37 when needed to obtain additional information, or to refer to additional data concerning a particular call. Communications with external services 37 may take place, for example, via one or more networks 31. In various embodiments, external services 37 may comprise web-enabled services or functionality related to or installed on the hardware device itself. For example, in one aspect where client applications 24 are implemented on a smartphone or other electronic device, client applications 24 may obtain information stored in a server system 32 in the cloud or on an external service 37 deployed on one or more of a particular enterprise's or user's premises.

In some embodiments, clients 33 or servers 32 (or both) may make use of one or more specialized services or appliances that may be deployed locally or remotely across one or more networks 31. For example, one or more databases 34 may be used or referred to by one or more embodiments. It should be understood by one having ordinary skill in the art that databases 34 may be arranged in a wide variety of architectures and using a wide variety of data access and manipulation means. For example, in various embodiments one or more databases 34 may comprise a relational database system using a structured query language (SQL), while others may comprise an alternative data storage technology such as those referred to in the art as "NoSQL" (for example, HADOOP CASSANDRA™, GOOGLE BIGTABLE™, and so forth). In some embodiments, variant database architectures such as column-oriented databases, in-memory databases, clustered databases, distributed databases, or even flat file data repositories may be used according to the aspect. It will be appreciated by one having ordinary skill in the art that any combination of known or future database technologies may be used as appropriate, unless a specific database technology or a specific arrangement of components is specified for a particular aspect described herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, some embodiments may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments without limitation, unless a specific security 36 or configuration system 35 or approach is specifically required by the description of any specific aspect.

Figure 14:
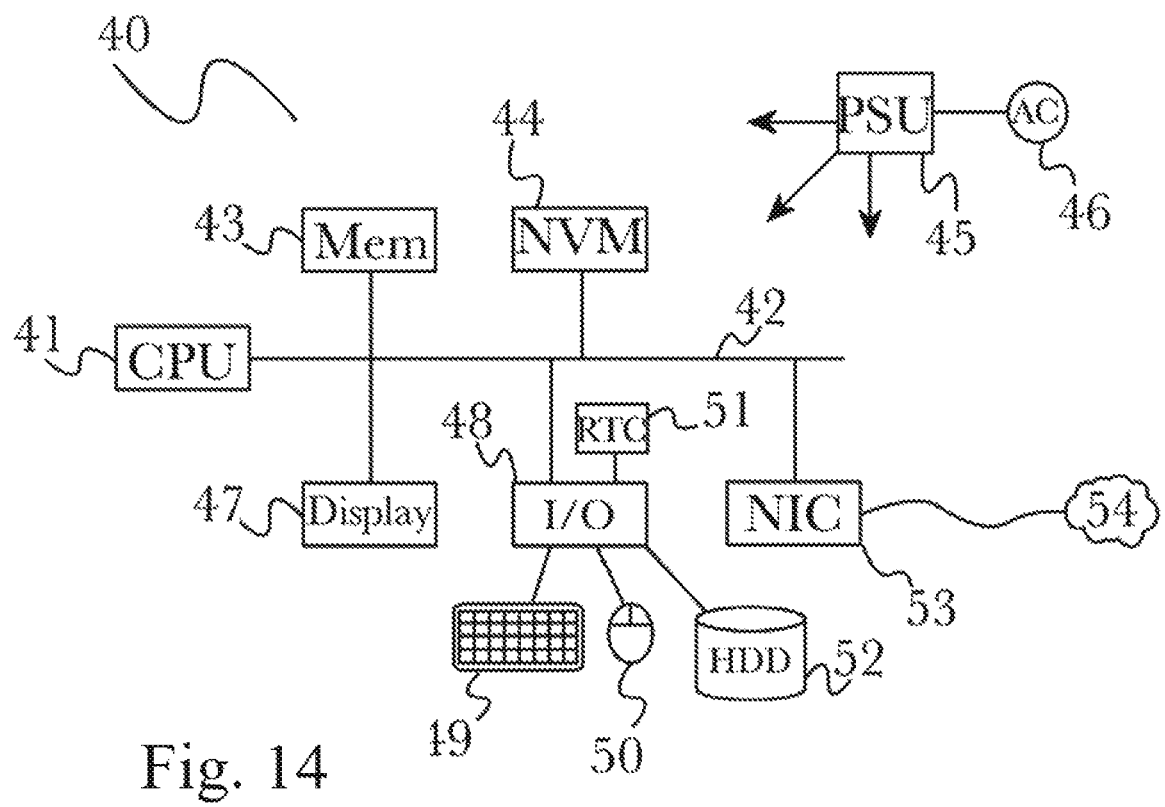
FIG. 14 illustrates components of a computing device that supports an embodiment of the inventive disclosure.

FIG. 14 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to keyboard 49, pointing device 50, hard disk 52, and real-time clock 51. NIC 53 connects to network 54, which may be the Internet or a local network, which local network may or may not have connections to the Internet. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various embodiments, functionality for implementing systems or methods of various embodiments may be distributed among any number of client and/or server components. For example, various software modules may be implemented for performing various functions in connection with the system of any particular aspect, and such modules may be variously implemented to run on server and/or client components.

The skilled person will be aware of a range of possible modifications of the various embodiments described above. Accordingly, the present invention is defined by the claims and their equivalents.

Additional Considerations

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for creating an interactive message through the disclosed principles herein. Thus, while particular embodiments and applications have been illustrated and described, it is to be understood that the disclosed embodiments are not limited to the precise construction and components disclosed herein. Various apparent modifications, changes and variations may be made in the arrangement, operation and details of the method and apparatus disclosed herein without departing from the spirit and scope defined in the appended claims.

What is claimed is:

1. A method of holistic application development and deployment in a distributed heterogeneous computing environment, the method comprising:
   identifying, by a processing system comprising a processor, message-passing boundaries and data dependencies between code paths in a heterogeneous network environment;
   identifying, by the processing system, independent networked computer resources from among a plurality of networked computer resources in a target system that includes the plurality of networked computer resources operating in the heterogeneous network environment, based on the message-passing boundaries and the data dependencies, the independent networked computer resources being identified as not sharing dependency on a peripheral networked computer resource with another networked computer resource of the target system;
   mapping, by the processing system, each one of the identified independent networked computer resources to respective ones of a set of target hardware nodes of the target system;
   generating, by the processor based at least in part on accessing a code library, intermediate code for each respective one of the target hardware nodes, the each respective one of the target hardware nodes being interconnected with others of the target hardware nodes via a respective communication interface;

generating, by the processing system, respective serialization codes for each respective communication interface between the target hardware nodes;

transmitting, by the processing system, the intermediate code for each respective one of the target hardware nodes to each one of the target hardware nodes; and transmitting, by the processing system, the respective serialization codes to each respective communication interface between the target hardware nodes, wherein the generating the serialization code comprises:
detecting a message type being provided between the respective communication interface; and
determining a serialization strategy for the message type according to security requirements for the respective communication interface and a channel configuration of the respective communication interface.

2. The method of claim 1, wherein the generating the intermediate code comprises accessing the code library to generate specialized code for the respective target hardware nodes.

3. The method of claim 2, wherein the code library comprises a generic library, an architecture optimized library, and a part-specific library.

4. The method of claim 1, wherein the method further comprises transforming the respective intermediate code into a format of the respective target hardware node.

5. A computer program product comprising a non-transitory computer readable storage medium storing instructions encoded thereon that, when executed by a processor, cause the processor to:

consume an application specification associated with a plurality of devices provided in a heterogeneous network environment as a consumed application specification;

identify message-passing boundaries and data dependencies between code paths in the heterogeneous network environment;

identify independent networked computer resources from among a plurality of networked computer resources in a target system that includes the plurality of networked computer resources in the heterogeneous network environment by identifying the message-passing boundaries and the data dependencies between code paths, each of the independent networked computer resources further being identified as not sharing dependency on a peripheral network computer resource with another networked computer resource of the target system;

map the consumed application specification to the independent networked computer resources by leveraging one or more code libraries;

encode at least one or more objects of the consumed application specification for a target communication channel by detecting message types that traverse each channel from one target node to another; and transform the consumed application specification into a format suitable for a target node, wherein the encoding of the at least one or more objects further comprises encoding the consumed application specification according to a determined security need for the communication channel.

6. The computer program product of claim 5, wherein the code library comprises one of a generic library, an architecture-optimized library, and a part-specific library.

7. A system of holistic application development and deployment in a distributed heterogeneous computing environment, the system comprising:

a processing system including a processor; and a memory, coupled to the processing system, that stores executable instructions and that, when executed by the processing system, facilitate performance of operations, comprising:

identifying message-passing boundaries and data dependencies between code paths in a heterogeneous network environment;

identifying independent networked computer resources from among a plurality of networked computer resources in a target system that includes the plurality of networked computer resources operating in the heterogeneous network environment, based on the message-passing boundaries and the data dependencies, the independent networked computer resources being identified as not sharing dependency on a peripheral network computer resource with another networked computer resource of the target system;

mapping each one of the identified independent networked computer resources to respective ones of a set of target hardware nodes of the target system;

generating, based at least in part on accessing a code library, respective serialization codes for each respective communication interface between the target hardware nodes, the respective ones of the target hardware nodes being interconnected with others of the target hardware nodes via a respective communication interface; and transmitting, by the processing system, the respective serialization codes to each respective communication interface between the target hardware nodes, wherein the generating the respective serialization codes comprises:
detecting a message type being provided between the respective communication interface,
wherein the generating the respective serialization codes further comprises determining a serialization strategy for the message type according to security requirements for the respective communication interface and a channel configuration of the respective communication interface.

8. The system of claim 7, wherein the operations further comprise generating intermediate code for each respective one of the target hardware nodes.

9. The system of claim 8, wherein the operations further comprise transforming the respective intermediate code into a format of the respective target hardware node.

10. The system of claim 8, wherein the operations further comprise transmitting the respective intermediate code to each one of the target hardware nodes.

11. The system of claim 8, wherein the generating the intermediate code comprises accessing the code library to generate specialized code for the respective target hardware nodes.

12. The system of claim 11, wherein the code library comprises a generic library, an architecture-optimized library, and a part-specific library.

* * * * *